(12) United States Patent
Cho et al.

(10) Patent No.: US 10,272,765 B1
(45) Date of Patent: Apr. 30, 2019

(54) POWER TRANSMISSION APPARATUS FOR A VEHICLE

(71) Applicants: HYUNDAI MOTOR COMPANY, Seoul (KR); KIA MOTORS CORPORATION, Seoul (KR)

(72) Inventors: Wonmin Cho, Hwaseong-si (KR); Seong Wook Hwang, Gunpo-si (KR); Kijong Park, Hwaseong-si (KR); Seongwook Ji, Gunpo-si (KR); Ki Dong Kim, Anyang-si (KR); Hyun Sik Kwon, Seoul (KR); Cheol Ho Jang, Busan (KR); Jae Chang Kook, Hwaseong-si (KR); Ki Tae Kim, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/821,487

(22) Filed: Nov. 22, 2017

(30) Foreign Application Priority Data

Nov. 1, 2017 (KR) .......................... 10-2017-0144496

(51) Int. Cl.
*B60K 6/365* (2007.10)
*F16H 37/04* (2006.01)
(Continued)

(52) U.S. Cl.
CPC .............. *B60K 6/543* (2013.01); *B60K 6/365* (2013.01); *B60K 6/48* (2013.01); *B60K 6/547* (2013.01);
(Continued)

(58) Field of Classification Search
CPC .......... B60K 6/543; B60K 6/365; B60K 6/48; B60K 6/547; B60K 2006/4816;
(Continued)

(56) References Cited

U.S. PATENT DOCUMENTS

| 7,066,043 | B2 * | 6/2006 | Kim ........................ F16H 3/006 74/330 |
| 7,070,534 | B2 * | 7/2006 | Pelouch ................ F16H 37/046 475/207 |

(Continued)

*Primary Examiner* — Jacob S. Scott
*Assistant Examiner* — Lillian T Nguyen
(74) *Attorney, Agent, or Firm* — Lempia Summerfield Katz LLC

(57) ABSTRACT

A power transmission apparatus for a vehicle may include: a first, second, third, and fourth input shaft; an output shaft; an idle shaft; a fixed transmission performing shifts to fixed shift stages depending on gear ratios of four change gear trains; and a torque assist driving and electronic continuously variable automatic transmission performing a torque assist for a torque input from the fixed transmission and performing electric vehicle driving and electronic continuously variable automatic transmission functions to output the torque through the output shaft. The disclosed power transmission apparatus implements fixed shift stages of four forward speeds and one reverse speed in a dual clutch transmission (DCT) structure that uses three synchronizers. The disclosed power transmission apparatus improves fuel consumption and acceleration performance by adding one planetary gear set and a motor/generator to enable driving in an electric vehicle (EV) mode and an electronic continuously variable automatic transmission (e-CVT) mode.

5 Claims, 2 Drawing Sheets

(51) Int. Cl.
  *B60K 6/48*   (2007.10)
  *B60K 6/547*   (2007.10)
  *B60K 6/543*   (2007.10)
  *F16H 3/00*   (2006.01)
  *F16H 3/091*   (2006.01)
  *F16H 37/08*   (2006.01)
  *F16H 3/72*   (2006.01)

(52) U.S. Cl.
  CPC ............. *F16H 3/006* (2013.01); *F16H 3/091* (2013.01); *F16H 3/725* (2013.01); *F16H 37/046* (2013.01); *F16H 37/0806* (2013.01); *B60K 2006/4816* (2013.01); *B60Y 2200/92* (2013.01); *F16H 2200/0043* (2013.01); *F16H 2200/2005* (2013.01); *F16H 2200/2033* (2013.01); *Y10S 903/91* (2013.01); *Y10S 903/918* (2013.01); *Y10S 903/919* (2013.01)

(58) Field of Classification Search
  CPC ...... F16H 37/0806; F16H 3/006; F16H 3/091; F16H 37/046; F16H 3/725; F16H 2200/0043; F16H 2200/2005; F16H 2200/2033; F16H 37/065; F16H 3/066; B60Y 2200/92; Y10S 903/91; Y10S 903/918; Y10S 903/919
  See application file for complete search history.

(56) References Cited

U.S. PATENT DOCUMENTS

| | | | | |
|---|---|---|---|---|
| 7,258,032 | B2* | 8/2007 | Kim | F16H 3/006 74/330 |
| 9,695,932 | B2* | 7/2017 | Lee | F16H 61/0403 |
| 2015/0167806 | A1* | 6/2015 | Lee | F16H 61/0403 475/5 |
| 2016/0102742 | A1* | 4/2016 | Lee | B60K 6/36 475/5 |
| 2017/0023104 | A1* | 1/2017 | Gwon | F16H 3/006 |
| 2018/0112745 | A1* | 4/2018 | Lee | F16H 3/006 |

* cited by examiner

FIG. 2

| DRIVING MODE | SHIFT STAGE | FRICTION ELEMENT | | | SL1 | | | SL2 | | | SL3 | | MG |
|---|---|---|---|---|---|---|---|---|---|---|---|---|---|
| | | CL1 | CL2 | CL3 | D1 | N | D3 | D2 | N | D4 | N | Re | |
| ENGINE DRIVING | REV | | ● | ● | | ● | | | ● | | | ● | □ |
| | N | | | (●) | | ● | | | ● | | ● | | □ |
| | D1 | ● | | ● | ● | | | | ● | | ● | | □ |
| | D2 | | ● | ● | | ● | | ● | | | ● | | □ |
| | D3 | ● | | ● | | | ● | | ● | | ● | | □ |
| | D4 | | ● | ● | | ● | | | | ● | ● | | □ |
| EV DRIVING | REV | | ● | | | ● | | | ● | | ● | | ■ (REVERSE ROTATION) |
| | D | | | ● | | ● | | | ● | | ● | | ■ |
| e-CVT DRIVING | REV | | ● | | | ● | | | ● | | | ● | ■ |
| | e-D1 | ● | | | ● | | | | ● | | ● | | ■ |
| | e-D2 | | ● | | | ● | | ● | | | ● | | ■ |
| | e-D3 | ● | | | | | ● | | ● | | ● | | ■ |
| | e-D4 | | ● | | | ● | | | | ● | ● | | ■ |

● : CLUTCH OPERATION AND SHIFT POSITION
■ : DRIVING BY ONLY MOTOR(EV)
□ : TORQUE ASSIST DRIVING

POWER TRANSMISSION APPARATUS FOR A VEHICLE

CROSS-REFERENCE TO RELATED APPLICATION

This application claims priority to and the benefit of Korean Patent Application No. 10-2017-0144496 filed in the Korean Intellectual Property Office on Nov. 1, 2017, the entire contents of which are incorporated herein by reference.

BACKGROUND

(a) Field of the Disclosure

The present disclosure relates to a power transmission apparatus for a vehicle. More particularly, the present disclosure relates to a power transmission apparatus for a vehicle having a dual clutch transmission (DCT) structure that uses three synchronizers, one planetary gear set, and a motor/generator to enable driving in an electric vehicle (EV) mode and an electronic continuously variable automatic transmission (e-CVT) mode.

(b) Description of the Related Art

Environmentally-friendly technology in vehicles is a key to survival for the future vehicle industry. Automakers have made every effort to develop environmentally-friendly vehicles that comply with environmental and fuel consumption regulations.

An example of future vehicle technology may include an electric vehicle (EV) and a hybrid electric vehicle (HEV), both of which use electric energy and a dual clutch transmission (DCT).

Since future vehicles as described above have several technical limitations such as weight, cost, and the like, automakers have paid attention to the hybrid electric vehicle as an alternative to solve the problems of satisfying exhaust gas regulations and improving fuel consumption performance. This has triggered fierce competition to put hybrid electric vehicles into practice.

In a hybrid electric vehicle, which is a vehicle using two or more power sources, the power sources may be combined with each other in several manners. Typically, an existing gasoline engine or diesel engine using a fossil fuel and a motor/generator driven by electrical energy are mixed with each other and used as the power sources.

Hybrid electric vehicles use the motor/generator having good low speed torque characteristics as a main power source at a low speed, and use the engine having good high speed torque characteristics as a main power source at a high speed.

Therefore, hybrid electric vehicles stop an operation of the engine using fossil fuel and use the motor/generator in a low speed section.

In addition, an example of a transmission that may be used in a hybrid electric vehicle as described above may include a dual clutch transmission (DCT). The DCT may use two clutches in a manual transmission structure.

In other words, the DCT is a transmission that performs shifts by alternately operating odd shift stages and even shift stages using the two clutches. A mechanism operating the shifts of the odd shift stages and the even shift stages as described above may suppress a torque disconnection existing at the time of performing a shift in an existing manual transmission (MT) and an automatic manual transmission (AMT).

However, the DCT has large clutch burning and energy loss due to clutch slip at the time of departure. The DCT also has a safety problem due to excessive backward movement caused by clutch slip at the time of hill climbing departure. Due to a clutch heat capacity problem, the DCT should control a shift time to be short in order to have a large shift shock as compared with an automatic transmission.

In addition, in order to use the DCT in a hybrid electric vehicle, the motor/generator, which is an electric power source, should be effectively disposed.

The above information disclosed in this Background section is only to enhance understanding of the background of the disclosure. Therefore, the background may contain information that is not prior art that is already known in this country to a person of ordinary skill in the art.

SUMMARY

The present disclosure is directed to a power transmission apparatus for a vehicle. The disclosed power transmission apparatus is capable of implementing fixed shift stages of four forward speeds and one reverse speed in a dual clutch transmission (DCT) structure that uses three synchronizers. The disclosed power transmission apparatus is capable of improving fuel consumption and acceleration performance by adding one planetary gear set and a motor/generator to enable driving in an electric vehicle (EV) mode and an electronic continuously variable automatic transmission (e-CVT) mode.

An embodiment of the present disclosure provides a power transmission apparatus for a vehicle, including: a first input shaft selectively connected to an engine output shaft through a first clutch; a second input shaft formed of a hollow shaft, disposed on an outer circumference of the first input shaft without rotation interference to overlap the first input shaft, and selectively connected to the engine output shaft through a second clutch; a third input shaft disposed in parallel with the first and second input shafts in a state in which the third input shaft is spaced apart from the first and second input shafts by predetermined intervals; an output shaft disposed in parallel with the first and second input shafts in a state in which the output shaft is spaced apart from the first and second input shafts by predetermined intervals; a fourth input shaft formed of a hollow shaft and disposed on an outer circumference of the output shaft without rotation interference to overlap the output shaft; an idle shaft disposed in a state in which the idle shaft is spaced apart from the first and second input shafts by predetermined intervals; a fixed transmission performing shifts to fixed shift stages depending on gear ratio of four change gear trains selectively disposed on the first, second, third, and fourth input shafts and the idle shaft and externally connected to each other; and a torque assist driving and electronic continuously variable automatic transmission disposed on the output shaft and one side end of the fourth input shaft. The torque assist driving and electronic continuously variable automatic transmission performs a torque assist for a torque input from the fixed transmission and performs electric vehicle driving and electronic continuously variable automatic transmission functions to output the torque through the output shaft.

The four change gear trains may include: a first change gear train including a first drive gear disposed on the outer circumference of the first input shaft without rotation interference, a second drive gear disposed on an outer circumference of the third input shaft without rotation interference, and a first driven gear formed integrally with the fourth input shaft and externally connected to both of the first drive gear and the second drive gear; a second change gear train including a reverse drive gear disposed on an outer circumference of the idle shaft without rotation interference and a second driven gear formed integrally with the fourth input shaft and externally connected to the reverse drive gear; a third change gear train including a third drive gear disposed on the outer circumference of the first input shaft without rotation interference, a fourth drive gear disposed on the outer circumference of the third input shaft without rotation interference, and a third driven gear formed integrally with the fourth input shaft and externally connected to both of the third drive gear and the fourth drive gear; and a fourth change gear train including a first power transferring gear formed integrally with the second input shaft, a second power transferring gear formed integrally with the third input shaft, and an idle gear formed integrally with the idle shaft and externally connected to both of the first power transferring gear and the second power transferring gear.

The first drive gear and the third drive gear may be selectively synchronously connected to the first input shaft by a first synchronizer. The second drive gear and the fourth drive gear may be selectively synchronously connected to the third input shaft by a second synchronizer. The reverse drive gear may be synchronously connected to the idle shaft by a third synchronizer.

The first change gear train may have a gear ratio for forward 1-speed and 2-speed, the second change gear train may have a gear ratio for reverse, the third change gear train may have a gear ratio for forward 3-speed and 4-speed, and the fourth change gear train may have a gear ratio for forward 2-speed and 4-speed and reverse.

The torque assist driving and electronic continuously variable automatic transmission may include: a motor/generator; a planetary gear set transferring torque input from the third input shaft and the motor/generator to the output shaft either as they are or controlling a rotation speed of the third input shaft depending on a rotation speed of a motor shaft of the motor/generator; and a third clutch selectively connecting two of three rotation elements to each other so that the planetary gear set integrally rotates.

The planetary gear set may be a pinion planetary gear set. The planetary gear set may include: a sun gear fixedly connected to the motor shaft of the motor/generator; a planetary carrier fixedly connected to the output shaft; and a ring gear fixedly connected to the third input shaft and selectively connected to the planetary carrier by the third clutch.

In an embodiment of the present disclosure, the fixed shift stages of four forward speeds and one reverse speed may be implemented in an existing DCT structure that uses three synchronizers.

In addition, in an embodiment of the present disclosure, one planetary gear set and a motor/generator are added to the DCT structure that uses the three synchronizers to enable the torque assist driving by the motor/generator in the fixed shift stages of four forward speeds and one reverse speed. This enables driving in the parallel hybrid mode.

In addition, in an embodiment of the present disclosure, one planetary gear set and a motor/generator are added to the DCT structure that uses the three synchronizers, such that the power source may be changed from the engine to the motor/generator in the EV mode. The forward and reverse driving in the EV mode is enabled by the forward/reverse rotation of the motor/generator when the third clutch is operated.

In addition, in an embodiment of the present disclosure, one planetary gear set and a motor/generator are added to the DCT structure that uses the three synchronizers. Therefore, in the fixed shift stages of four forward speeds and one reverse speed, after the operation of the third clutch CL3 is released, the rotation speed of the engine ENG is controlled depending on the control of the motor/generator MG to enable driving in the e-CVT mode.

Other effects that may be obtained or are predicted by embodiments of the present disclosure are explicitly or implicitly described in the detailed description below. In other words, various effects that are predicted according to embodiments of the present disclosure will be described in the detailed description below.

BRIEF DESCRIPTION OF THE DRAWINGS

FIG. 2 is a shift operation table of the power transmission apparatus for a vehicle according to an embodiment of the present disclosure.

DETAILED DESCRIPTION OF THE EMBODIMENTS

Figure 1:
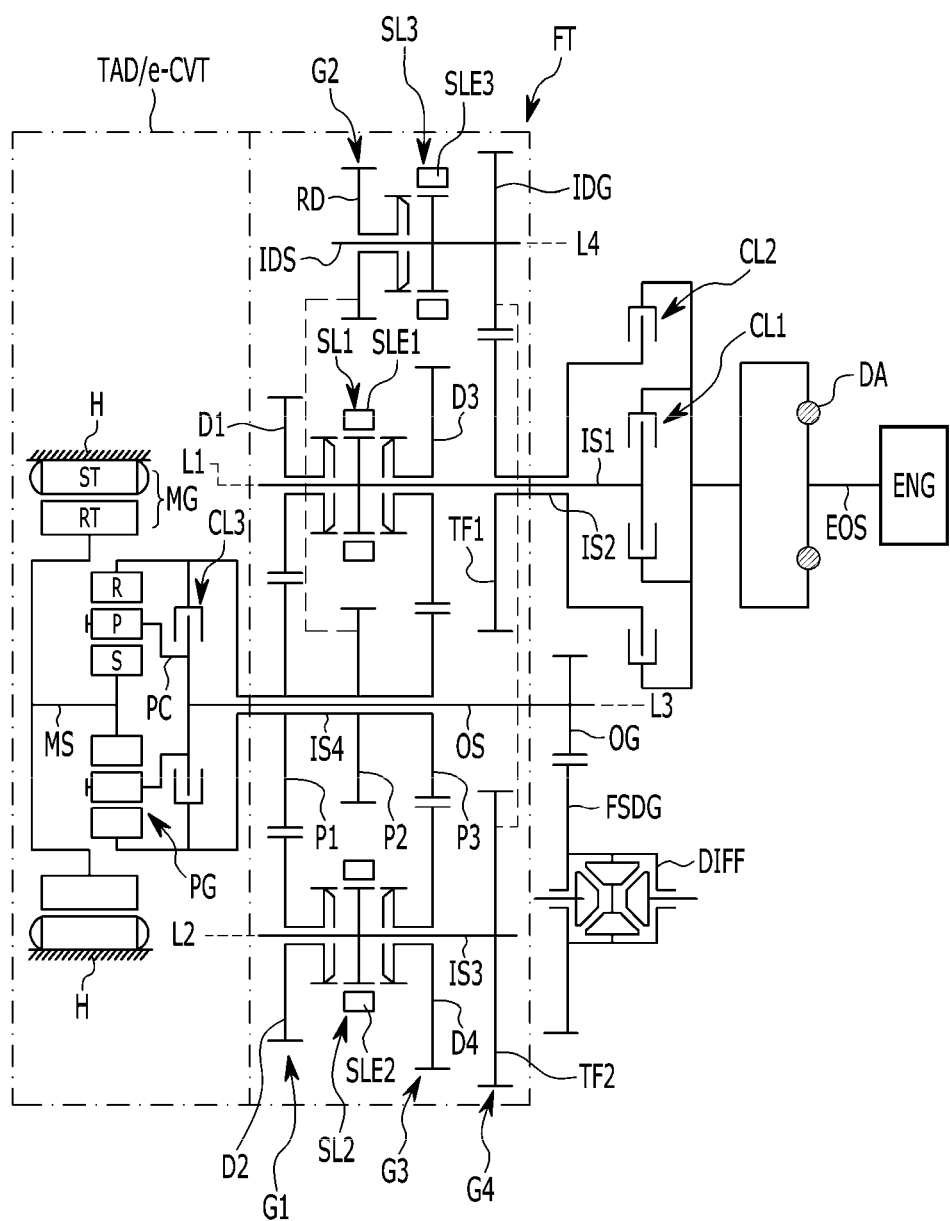
FIG. 1 is a configuration diagram of a power transmission apparatus for a vehicle according to an embodiment of the present disclosure.

It is desired to develop a power transmission apparatus capable of improving fuel consumption and acceleration performance and reducing exhaust gas by adding one planetary gear set and a motor/generator to enable driving in an electric vehicle (EV) mode and an electronic continuously variable automatic transmission (e-CVT) mode. In one example, development of a high efficiency power transmission apparatus that achieves at least four forward speeds and one reverse speed is desirable. In this aspect, the present disclosure relates to a power transmission apparatus for a vehicle. The disclosed power transmission apparatus may improve efficiency and convenience by implementing fixed shift stages of four forward speeds and one reverse speed having a dual clutch transmission (DCT) structure. The disclosed power transmission apparatus may also improve fuel efficiency and decrease exhaust gas by stopping the operation of an engine using fossil fuel and instead using a motor/generator in a low speed section.

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure. In the drawings, the following symbols are used to identify various elements of the disclosed embodiments, wherein:

i. CL1, CL2, CL3 represent first, second, and third clutches;
ii. D1, D2, D3, D4 represent first, second, third, and fourth drive gears;
iii. TAD/e-CVT represents a torque assist driving and electronic continuously variable automatic transmission;
iv. FT represents a fixed transmission;
v. G1, G2, G3, G4 represent first, second, third, and fourth change gear trains;
vi. EOS represents an engine output shaft (crankshaft);

vii. IDS represents an idle shaft;
viii. IDG represents an idle gear;
ix. IS1, IS2, IS3, IS4 represent first, second, third, and fourth input shafts;
x. MG represents a motor/generator;
xi. OG represents an output gear;
xii. OS represents an output shaft;
xiii. P1, P2, P3 represent first, second, and third driven gears;
xiv. PG represents a planetary gear set;
xv. SL1, SL2, SL3 represent first, second, and third synchronizers;
xvi. SLE1, SLE2, SLE3 represent first, second, and third sleeves; and
xvii. TF1, TF2 represent first and second power transferring gears.

Portions unrelated to the description are omitted to clearly describe the present disclosure. Also, similar reference numerals are used to describe the same or similar portions throughout the specification.

In the following description, using names or terms to identify components such as first, second, third, and the like is to differentiate the names because the names of the components are otherwise the same as each other. Such a naming convention is not intended to denote or set an order thereof and the disclosure is not intended to be so limited.

FIG. 1 is a configuration diagram of a power transmission apparatus for a vehicle according to one embodiment of the present disclosure.

Referring to FIG. 1, the power transmission apparatus for a vehicle according to one embodiment of the present disclosure is configured to include three synchronizers SL1, SL2, and SL3, a fixed transmission FT performing fixed shifts of four forward speeds and one rear speed on a torque of an engine ENG, and a torque assist driving and electronic continuously variable automatic transmission TAD/e-CVT including one planetary gear set PG and a motor/generator MG, which, as used herein, is a device that operates or functions as a motor and a generator. The torque assist driving and electronic continuously variable automatic transmission TAD/e-CVT enables power generation, torque assist, electric vehicle (EV) driving, and electronic continuously variable automatic transmission functions.

The engine ENG, which is the power source, may be one of various known engines using a fossil fuel, such as an existing gasoline engine, diesel engine, or the like.

The fixed transmission FT and the torque assist driving and electronic continuously variable automatic transmission TAD/e-CVT are disposed on first, second, third, and fourth shaft lines L1, L2, L3, and L4 disposed in parallel with each other in a state in which they are spaced apart from each other by predetermined intervals.

First and second input shafts IS1 and IS2 are disposed on the first shaft line L1. A third input shaft IS3 is disposed on the second shaft line L2. An output shaft OS, a fourth input shaft IS4, the planetary gear set PG, and the motor/generator MG are disposed on the third shaft line L3. An idle shaft IDS is disposed on the fourth shaft line L4.

The first input shaft IS1 disposed on the first shaft line L1 is selectively connected to an engine output shaft (EOS: crankshaft) through a first clutch CL1. The first input shaft IS1 selectively transfers the torque of the engine ENG to odd shift stages of the fixed transmission FT.

The second input shaft IS2 disposed on the first shaft line L1 is formed of a hollow shaft, is disposed on an outer circumference of the first input shaft IS1 without rotation interference, and is selectively connected to the engine output shaft EOS through a second clutch CL2. The second input shaft IS2 selectively transfers the torque of the engine ENG to the idle shaft IDS.

The third input shaft IS3 disposed on the second shaft line L2 transfers the torque of the second input shaft IS2 transferred through the idle shaft IDS to even shift stages of the fixed transmission FT.

The output shaft OS disposed on the third shaft line L3 transfers a torque transferred from the planetary gear set PG and the motor/generator MG disposed behind the output shaft OS on the same shaft line as that of the output shaft OS to a final reduction gear FSDG including a differential DIFF through an output gear OG.

The fourth input shaft IS4 disposed on the third shaft line L3 is formed of a hollow shaft, is disposed on an outer circumference of the output shaft OS without rotation interference, and transfers shifted torques transferred from the odd shift stages of the first input shaft IS1 and the even shift stages of the third input shaft IS3 to any one of three rotation elements of the planetary gear set PG.

The idle shaft IDS disposed on the fourth shaft line L4 transfers the torque input from the second input shaft IS2 to the third input shaft IS3 or the fourth input shaft IS4.

The fixed transmission FT is configured to include the first, second, third, and fourth input shafts 1S1, IS2, IS3, and IS4 and the first, second, third, and fourth change gear trains G1, G2, G3, and G4 disposed on the idle shaft IDS. The first, second, third, and fourth change gear trains G1, G2, G3, and G4 are disposed in a sequence of the first, second, third, and fourth change gear trains G1, G2, G3, and G4 from an opposite side of the engine ENG toward the engine ENG.

The first change gear train G1 is configured to include a first drive gear D1 disposed on the outer circumference of the first input shaft IS1 without rotation interference, a second drive gear D2 disposed on an outer circumference of the third input shaft IS3 without rotation interference, and a first driven gear P1 formed integrally with the fourth input shaft IS4 and externally connected to both of the first drive gear D1 and the second drive gear D2.

The second change gear train G2 is configured to include a reverse drive gear RD disposed on an outer circumference of the idle shaft IDS without rotation interference and a second driven gear P2 formed integrally with the fourth input shaft IS4 and externally connected to the reverse drive gear RD.

The third change gear train G3 is configured to include a third drive gear D3 disposed on the outer circumference of the first input shaft IS1 without rotation interference, a fourth drive gear D4 disposed on the outer circumference of the third input shaft IS3 without rotation interference, and a third driven gear P3 formed integrally with the fourth input shaft IS4 and externally connected to both of the third drive gear D3 and the fourth drive gear D4.

The fourth change gear train G4 is configured to include a first power transferring gear TF1 formed integrally with the second input shaft IS2, a second power transferring gear TF2 formed integrally with the third input shaft IS3, and an idle gear IDG formed integrally with the idle shaft IDS and externally connected to both of the first power transferring gear TF1 and the second power transferring gear TF2.

In this embodiment, a first synchronizer SL1 is disposed between the first drive gear D1 and the third drive gear D3 to selectively synchronously connect the first drive gear D1 and the third drive gear D3 to the first input shaft IS1.

In addition, a second synchronizer SL2 is disposed between the second drive gear D2 and the fourth drive gear D4 to selectively synchronously connect the second drive gear D3 and the fourth drive gear D4 to the third input shaft IS3.

A third synchronizer SL3 is disposed between the reverse drive gear RD and the idle shaft IDS to selectively synchronously connect the reverse drive gear RD to the idle shaft IDS.

As described above, in the fixed transmission FT, gear ratios for the respective drive gears and driven gears forming the four change gear trains G1, G2, G3, and G4 may be changed depending on a design condition of a corresponding transmission. In an embodiment of the present disclosure, the first change gear train G1 has a gear ratio for 1-speed and 2-speed, the second change gear train G2 has a gear ratio for reverse, the third change gear train G3 has a gear ratio for 3-speed and 4-speed, and the fourth change gear train G4 has a gear ratio set so that the third input shaft IS3 may rotate by the same revolution per minute (RPM) as that of the second input shaft IS2.

Although the fourth change gear train G4 may have the gear ratio set so that the second and third input shafts IS2 and IS3 may rotate by the same RPM as described above, the gear ratio of the fourth change gear train G4 is not so limited and may be changed depending on gear ratios between the second drive gear D2 and the first driven gear P1, the fourth drive gear D4 and the third driven gear P3, and the reverse drive gear RD and the second driven gear P2.

Therefore, shifts of four forward speeds and one reverse speed are performed in the fixed transmission FT by the abovementioned configuration.

In this embodiment, since the first, second, and third synchronizers SL1, SL2, and SL3 are known components, a detailed description thereof is omitted. First, second, and third sleeves SLE1, SLE2, and SLE3 used in the first, second, and third synchronizers SL1, SL2, and SL3 include separate actuators (not shown) as known. The actuators perform a shift while being controlled by a transmission control unit.

The motor/generator MG and the planetary gear set PG constituting the torque assist driving and electronic continuously variable automatic transmission TAD/e-CVT are disposed on a motor shaft MS disposed on the same shaft line as that of the output shaft OS.

The motor/generator MG, which is an electric supplementary drive unit, serves as a motor generating driving force and a generator generating reaction force as known. The motor/generator MG is configured to include a stator ST fixed to a transmission housing H and a rotor RT rotatably supported inside the stator ST in a radial direction. The rotor RT is directly connected to the motor shaft MS.

The planetary gear set PG, which is a single pinion planetary gear set, includes a sun gear S, a planetary carrier PC rotatably and revolvably supporting a plurality of pinion gears P externally engaged with the sun gear S, and a ring gear R internally connected to the plurality of pinion gears P to be engaged with the sun gear S.

In addition, the sun gear S is directly connected to the motor shaft MS. The planetary carrier PC is directly connected to the output shaft OS and is selectively connected to the fourth input shaft IS4 with a third clutch CL3 interposed therebetween. The ring gear R is directly connected to the fourth input shaft IS4.

Therefore, when the third clutch CL3 is operated, the entire planetary gear set PG is locked to become integral. When the torque is input to the sun gear S or the ring gear R in such a state, the input torque is transferred to the output shaft OS through the planetary carrier PC as it is.

In this embodiment, the first, second, and the third clutches CL1, CL2, and CL3 and a brake BK, which are coupling elements, are hydraulic friction coupling units operated by a hydraulic pressure supplied by a hydraulic control apparatus. The hydraulic friction coupling units are mainly multi-plate wet hydraulic friction coupling units, but may be coupling units that may be operated depending on electrical signals supplied from an electronic control apparatus, such as a dog clutch, an electronic clutch, a magnetic clutch, and the like.

In FIG. 1, reference numeral DA that is not described indicates a damper damping a torque variation of the engine ENG.

FIG. 2 is a shift operation table of the power transmission apparatus for a vehicle according to an embodiment of the present disclosure. Shift processes will be described with reference to FIG. 2.

[Reverse]

In a reverse shift stage REV, as shown in FIG. 2, the reverse drive gear RD and the idle shaft IDS are synchronously connected to each other through the third sleeve SLE3 of the third synchronizer SL3. In the reverse shift stage REV the second clutch CL2 and the third clutch CL3 are operated.

Therefore, the torque of the engine ENG is transferred to the ring gear R of the planetary gear set PG through the second clutch CL2, the second input shaft IS2, the first power transferring gear TF1, the idle gear IDG, the idle shaft IDS, the reverse drive gear RD, the second driven gear P2, and the fourth input shaft IS4 by the operation of the second clutch CL2.

In this arrangement, the planetary gear set PG becomes integral by the operation of the third clutch CL3. Therefore, the torque input to the ring gear R is output to the final reduction gear FSDG including the differential DIFF through the output shaft OS and the output gear OG in a reverse rotation direction, such that reverse driving is performed.

[Forward 1-Speed]

In forward 1-speed D1, as shown in FIG. 2, the first drive gear D1 and the first input shaft IS1 are synchronously connected to each other through the first sleeve SLE1 of the first synchronizer SL1. In forward 1-speed D1 the first clutch CL1 and the third clutch CL3 are operated.

Therefore, the torque of the engine ENG is transferred to the ring gear R of the planetary gear set PG through the first clutch CL1, the first input shaft IS1, the first drive gear D1, the first driven gear P1, and the fourth input shaft IS4 by the operation of the first clutch CL1.

In this arrangement, the planetary gear set PG becomes integral by the operation of the third clutch CL3. Therefore, the torque input to the ring gear R is output to the final reduction gear FSDG including the differential DIFF through the output shaft OS and the output gear OG, such that forward 1-speed driving is performed.

[Forward 2-Speed]

In forward 2-speed D2, as shown in FIG. 2, the second drive gear D2 and the third input shaft IS3 are synchronously connected to each other through the second sleeve SLE2 of the second synchronizer SL2. In forward 2-speed D2 the second clutch CL2 and the third clutch CL3 are operated.

Therefore, the torque of the engine ENG is transferred to the ring gear R of the planetary gear set PG through the second clutch CL2, the second input shaft IS2, the first power transferring gear TF1, the idle gear IDG, the second power transferring gear TF2, the third input shaft IS3, the second drive gear D2, the first driven gear P1, and the fourth input shaft IS4 by the operation of the second clutch CL2.

In this arrangement, the planetary gear set PG becomes integral by the operation of the third clutch CL3. Therefore, the torque input to the ring gear R is output to the final reduction gear FSDG including the differential DIFF through the output shaft OS and the output gear OG, such that forward 2-speed driving is performed.

[Forward 3-Speed]

In forward 3-speed D3, as shown in FIG. 2, the third drive gear D3 and the first input shaft IS1 are synchronously connected to each other through the first sleeve SLE1 of the first synchronizer SL1. In forward 3-speed D3 the first clutch CL1 and the third clutch CL3 are operated.

Therefore, the torque of the engine ENG is transferred to the ring gear R of the planetary gear set PG through the first clutch CL1, the first input shaft IS1, the third drive gear D3, the third driven gear P3, and the fourth input shaft IS4 by the operation of the first clutch CL1.

In this arrangement, the planetary gear set PG becomes integral by the operation of the third clutch CL3. Therefore, the torque input to the ring gear R is transferred to the final reduction gear FSDG including the differential DIFF through the output shaft OS and the output gear OG, such that forward 3-speed driving is performed.

[Forward 4-Speed]

In forward 4-speed D4, as shown in FIG. 2, the fourth drive gear D4 and the third input shaft IS3 are synchronously connected to each other through the second sleeve SLE2 of the second synchronizer SL2. In forward 4-speed D4 the second clutch CL2 and the third clutch CL3 are operated.

Therefore, the torque of the engine ENG is transferred to the ring gear R of the planetary gear set PG through the second clutch CL2, the second input shaft IS2, the first power transferring gear TF1, the idle gear IDG, the second power transferring gear TF2, the third input shaft IS3, the fourth drive gear D4, the fourth driven gear P4, and the fourth input shaft IS4 by the operation of the second clutch CL2.

In this arrangement, the planetary gear set PG becomes integral by the operation of the third clutch CL3. Therefore, the torque input to the ring gear R is output to the final reduction gear FSDG including the differential DIFF through the output shaft OS and the output gear OG, such that forward 4-speed driving is performed.

In the fixed shift stages of four forward speeds and one reverse speed as described above and as shown in FIG. 2, torque assist driving by the motor/generator MG is enabled. Thus, driving in a parallel hybrid mode is also enabled.

In addition, in an EV mode, as shown in FIG. 2, a power source is changed from the engine to the motor/generator. Forward and reverse driving in the EV mode is enabled by forward/reverse rotation of the motor/generator when the third clutch CL3 is operated.

In addition, in the fixed shift stages of four forward speeds and one reverse speed, as shown in FIG. 2, after the operation of the third clutch CL3 is released, a rotation speed of the engine ENG is controlled depending on a control of the motor/generator MG to enable driving in an e-CVT mode.

As described above, in the power transmission apparatus for a vehicle according to one embodiment of the present disclosure, the fixed shift stages of four forward speeds and one reverse speed may be implemented in an existing dual clutch transmission (DCT) structure that uses three synchronizers.

In addition, in the power transmission apparatus for a vehicle according to one embodiment of the present disclosure, one planetary gear set and a motor/generator are added to the DCT structure that uses the three synchronizers to enable the torque assist driving by the motor/generator in the fixed shift stages of four forward speeds and one reverse speed. This arrangement enables driving in the parallel hybrid mode.

In addition, in the power transmission apparatus for a vehicle according to one embodiment of the present disclosure, one planetary gear set and a motor/generator are added to the DCT structure that uses the three synchronizers, such that the power source may be changed from the engine to the motor/generator in the EV mode. In this arrangement, the forward and reverse driving in the EV mode is enabled by the forward/reverse rotation of the motor/generator when the third clutch is operated.

In addition, in the power transmission apparatus for a vehicle according to one embodiment of the present disclosure, one planetary gear set and a motor/generator are added to the DCT structure that uses the three synchronizers. Therefore, in the fixed shift stages of four forward speeds and one reverse speed, after the operation of the third clutch CL3 is released, the rotation speed of the engine ENG is controlled depending on the control of the motor/generator MG to enable the driving in the e-CVT mode.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A power transmission apparatus for a vehicle, the power transmission apparatus comprising:
   a first input shaft selectively connected to an engine output shaft through a first clutch;
   a second input shaft formed of a hollow shaft and disposed on an outer circumference of the first input shaft without rotation interference to overlap the first input shaft, the second input shaft being selectively connected to the engine output shaft through a second clutch;
   a third input shaft disposed in parallel with the first and second input shafts, wherein the third input shaft is spaced apart from the first and second input shafts by predetermined intervals;
   an output shaft disposed in parallel with the first and second input shafts, wherein the output shaft is spaced apart from the first and second input shafts by predetermined intervals;
   a fourth input shaft formed of a hollow shaft and disposed on an outer circumference of the output shaft without rotation interference to overlap the output shaft;
   an idle shaft spaced apart from the first and second input shafts by predetermined intervals;
   a fixed transmission configured to shift fixed shift stages depending on gear ratios of four change gear trains, wherein the four change gear trains are selectively disposed on the first, second, third, and fourth input shafts and the idle shaft and externally connected to each other; and
   a torque assist driving and electronic continuously variable automatic transmission disposed on the output shaft and one side end of the fourth input shaft, wherein the torque assist driving and electronic continuously variable automatic transmission is configured to perform a torque assist for a torque input from the fixed transmission as well as electric vehicle driving and electronic continuously variable automatic transmission functions to output the torque through the output shaft, wherein the four change gear trains include:
- a first change gear train including a first drive gear disposed on the outer circumference of the first input shaft without rotation interference, a second drive gear disposed on an outer circumference of the third input shaft without rotation interference, and a first driven gear formed integrally with the fourth input shaft and externally connected to both of the first drive gear and the second drive gear;
- a second change gear train including a reverse drive gear disposed on an outer circumference of the idle shaft without rotation interference and a second driven gear formed integrally with the fourth input shaft and externally connected to the reverse drive gear;
- a third change gear train including a third drive gear disposed on the outer circumference of the first input shaft without rotation interference, a fourth drive gear disposed on the outer circumference of the third input shaft without rotation interference, and a third driven gear formed integrally with the fourth input shaft and externally connected to both of the third drive gear and the fourth drive gear; and
- a fourth change gear train including a first power transferring gear formed integrally with the second input shaft, a second power transferring gear formed integrally with the third input shaft, and an idle gear formed integrally with the idle shaft and externally connected to both of the first power transferring gear and the second power transferring gear.

2. The power transmission apparatus of claim 1, wherein:
the first drive gear and the third drive gear are selectively synchronously connected to the first input shaft by a first synchronizer,
the second drive gear and the fourth drive gear are selectively synchronously connected to the third input shaft by a second synchronizer, and
the reverse drive gear is synchronously connected to the idle shaft by a third synchronizer.

3. The power transmission apparatus of claim 1, wherein:
the first change gear train has a gear ratio for forward 1-speed and 2-speed,
the second change gear train has a gear ratio for reverse,
the third change gear train has a gear ratio for forward 3-speed and 4-speed, and
the fourth change gear train has a gear ratio for forward 2-speed and 4-speed and reverse.

4. The power transmission apparatus of claim 1, wherein:
the torque assist driving and electronic continuously variable automatic transmission includes:
a motor/generator;
a planetary gear set configured to transfer torque input from the third input shaft and the motor/generator to the output shaft or control a rotation speed of the third input shaft depending on a rotation speed of a motor shaft of the motor/generator; and
a third clutch selectively connecting two of three rotation elements to each other so that the planetary gear set integrally rotates.

5. The power transmission apparatus of claim 4, wherein:
the planetary gear set is a pinion planetary gear set, and includes:
a sun gear fixedly connected to the motor shaft of the motor/generator;
a planetary carrier fixedly connected to the output shaft; and
a ring gear fixedly connected to the third input shaft and selectively connected to the planetary carrier by the third clutch.

* * * * *